United States Patent
Miyagoe

(10) Patent No.: US 7,088,068 B2
(45) Date of Patent: Aug. 8, 2006

(54) SENSORLESS MOTOR DRIVING APPARATUS AND DRIVING METHOD ADDRESSING PREVENTION OF BACKWARD ROTATION

(75) Inventor: Yasuhiro Miyagoe, Kyoto (JP)

(73) Assignee: Rohm Co., Ltd. (JP)

( * ) Notice: Subject to any disclaimer, the term of this patent is extended or adjusted under 35 U.S.C. 154(b) by 0 days.

(21) Appl. No.: 10/957,257

(22) Filed: Oct. 1, 2004

(65) Prior Publication Data

US 2005/0073274 A1  Apr. 7, 2005

(30) Foreign Application Priority Data

Oct. 3, 2003  (JP)  ............................ 2003-345251

(51) Int. Cl.
*H02P 6/20*  (2006.01)

(52) U.S. Cl. ...................... 318/439; 318/103; 318/430; 318/431; 318/62; 318/72; 318/254; 318/101

(58) Field of Classification Search ................ 318/439, 318/700, 705, 706, 717, 430, 431, 138, 720–724, 318/254, 62, 101
See application file for complete search history.

(56) References Cited

U.S. PATENT DOCUMENTS

| | | | | |
|---|---|---|---|---|
| 5,396,159 A | * | 3/1995 | Kaneda | 318/431 |
| 5,530,326 A | * | 6/1996 | Galvin et al. | 318/254 |
| 5,726,543 A | * | 3/1998 | Park et al. | 318/254 |
| 5,970,733 A | * | 10/1999 | Hamaoka et al. | 62/228.4 |
| 6,323,612 B1 | * | 11/2001 | Miyagoe | 318/432 |
| 6,429,996 B1 | * | 8/2002 | Iwashiro | 360/78.07 |
| 6,624,602 B1 | * | 9/2003 | Ikegami et al. | 318/254 |
| 6,992,459 B1 | * | 1/2006 | Kikuchi | 318/696 |
| 2005/0189898 A1 | * | 9/2005 | Muroi | 318/560 |

FOREIGN PATENT DOCUMENTS

JP  6-141588  5/1994

* cited by examiner

*Primary Examiner*—Rina Duda
*Assistant Examiner*—Elias Hiruy
(74) *Attorney, Agent, or Firm*—Cantor Colburn LLP

(57) ABSTRACT

The sensorless motor driving apparatus according to the invention may include: a timing generation circuit generating a timing signal at intervals T; a driving signal generation circuit receiving the timing signal and generating, at the intervals T, pulse signals, the number of which M (=m×L+k) is defined by a sum of a predetermined number k and a product of the number of statuses L of the rotor and an integer (m) equal to or greater than 1; and an amplitude control circuit switching between commutation patterns of the driving signal in synchronization with the pulse signals.

12 Claims, 8 Drawing Sheets

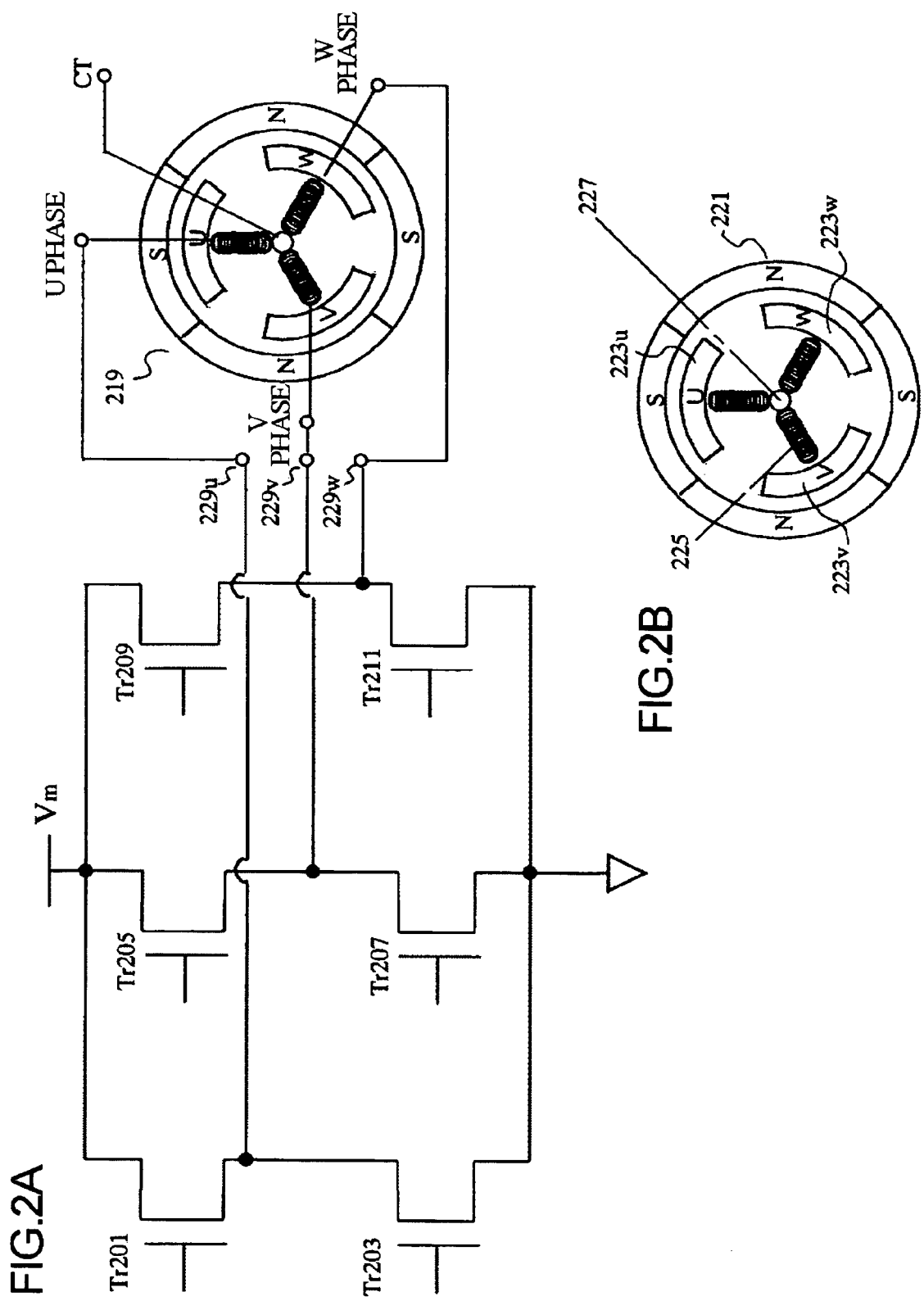

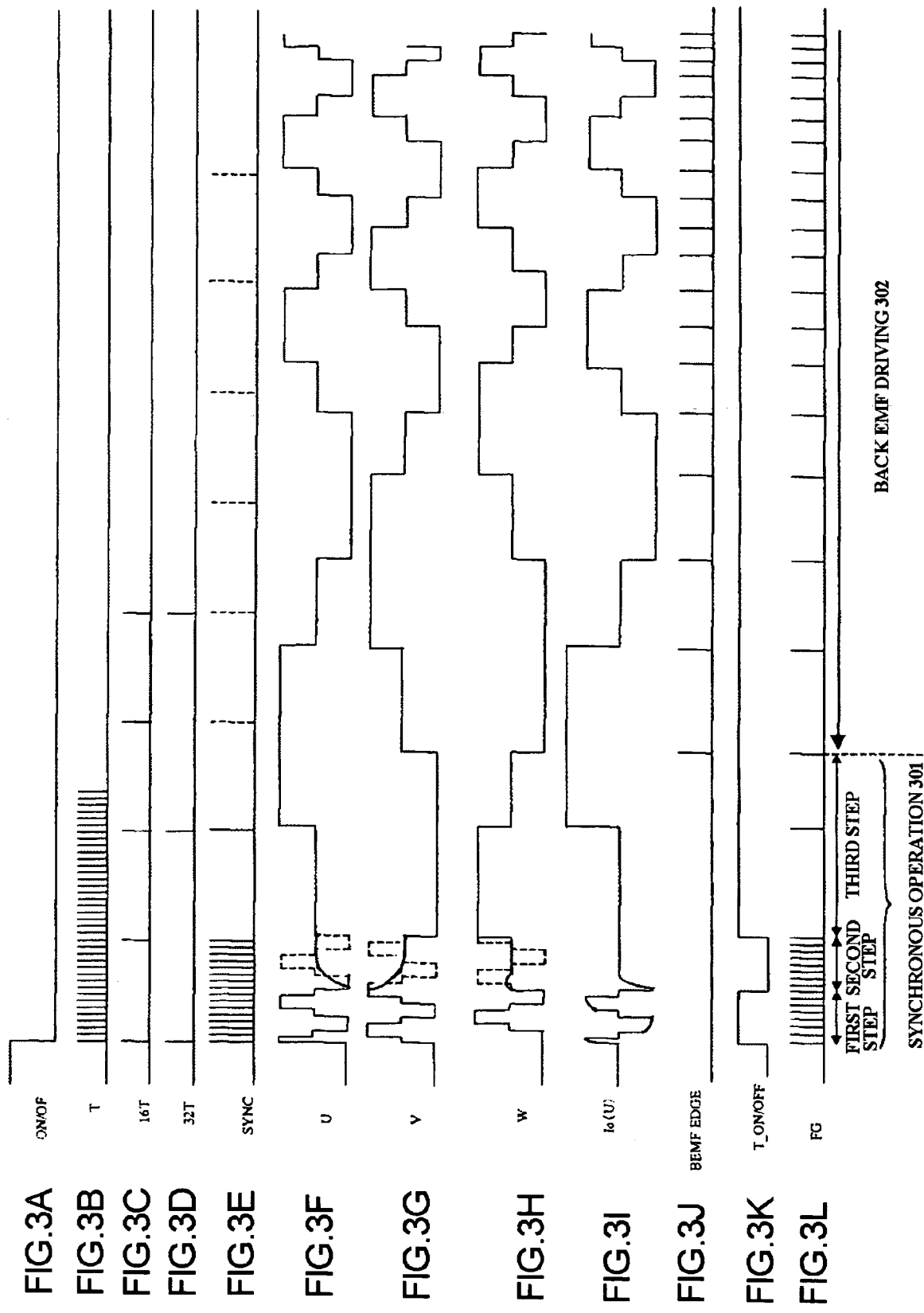

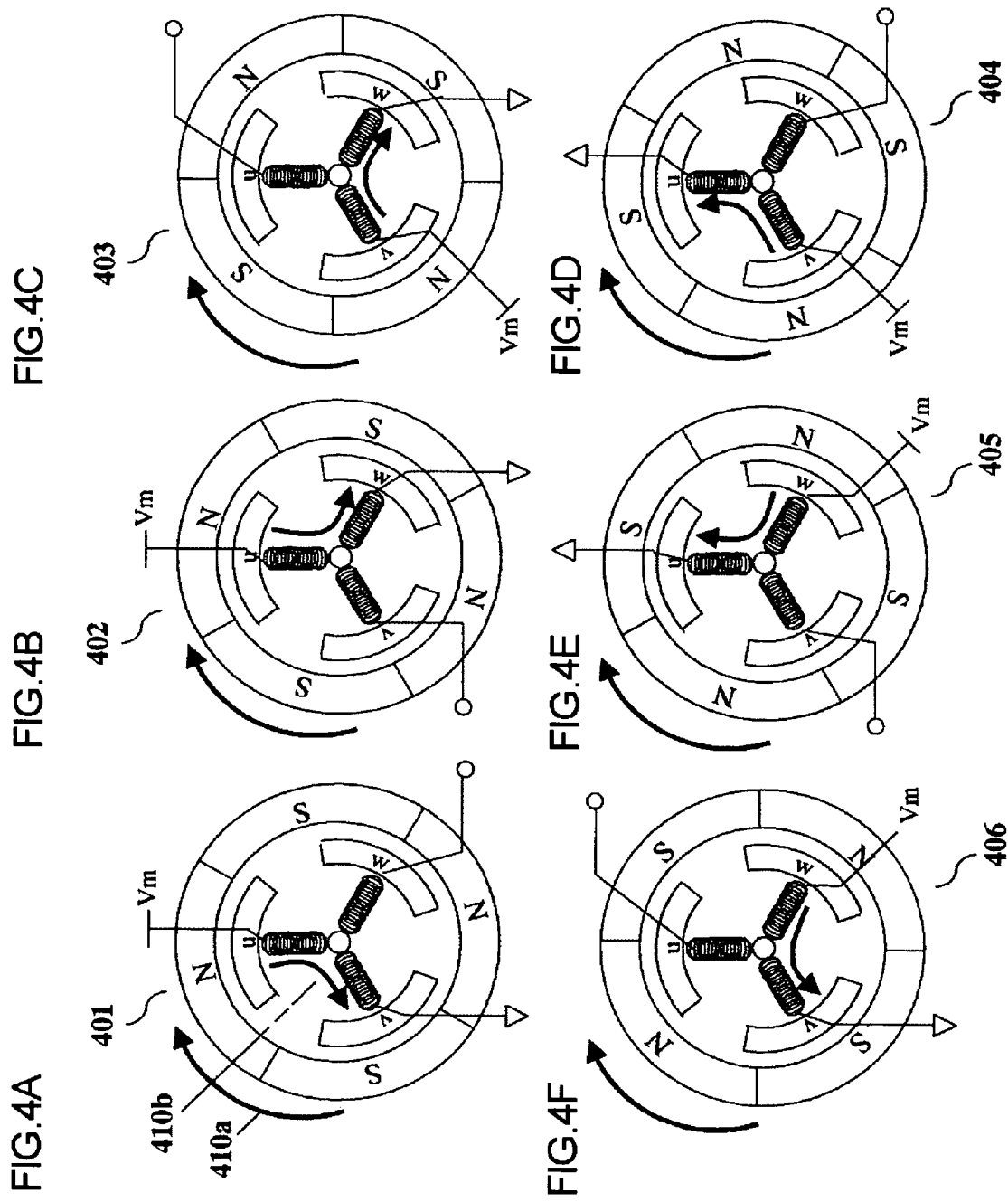

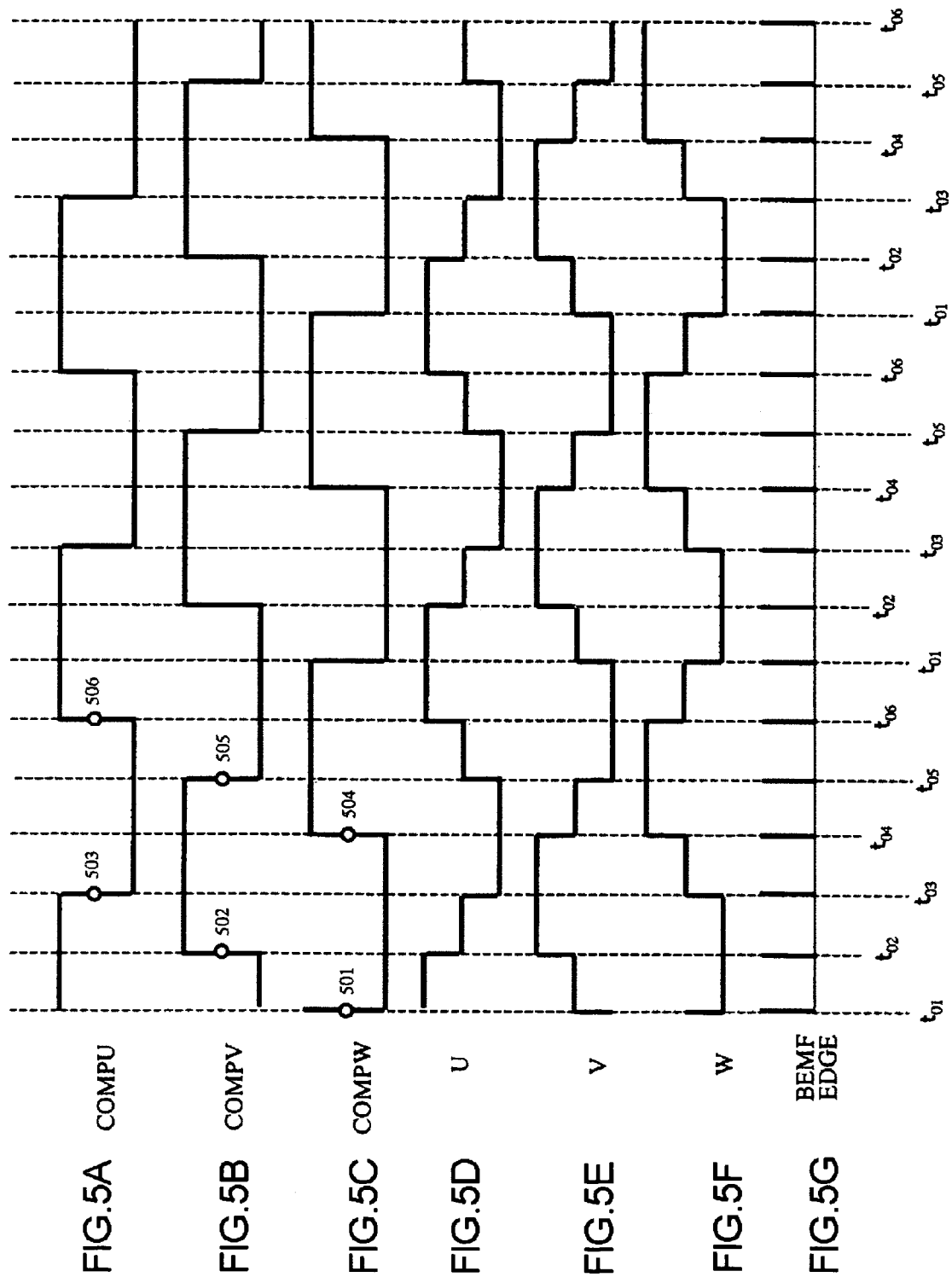

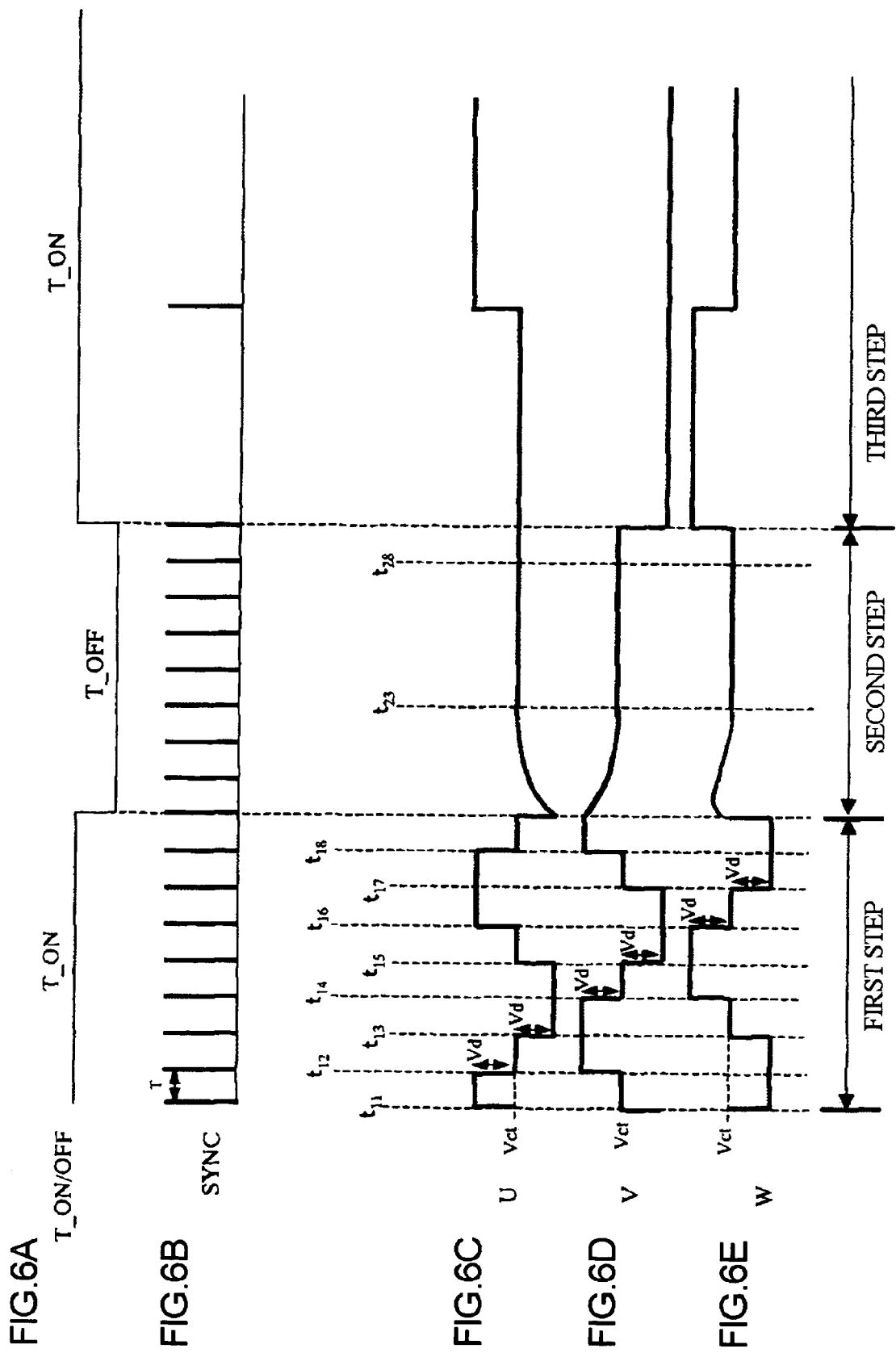

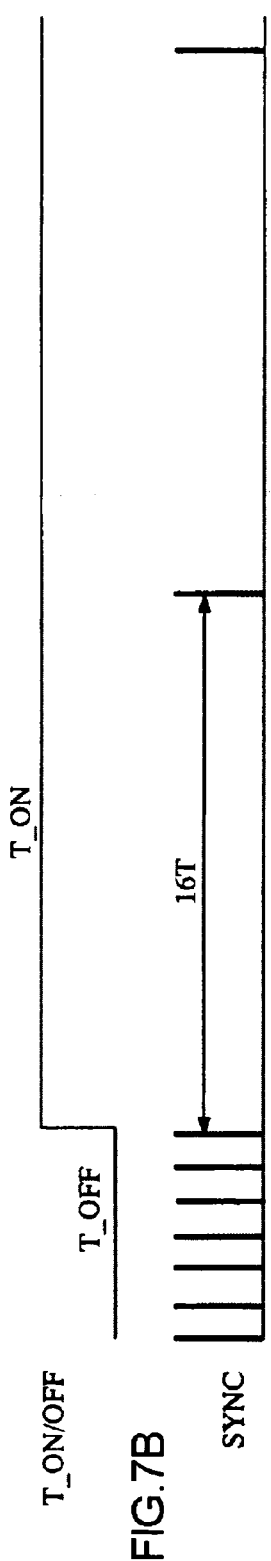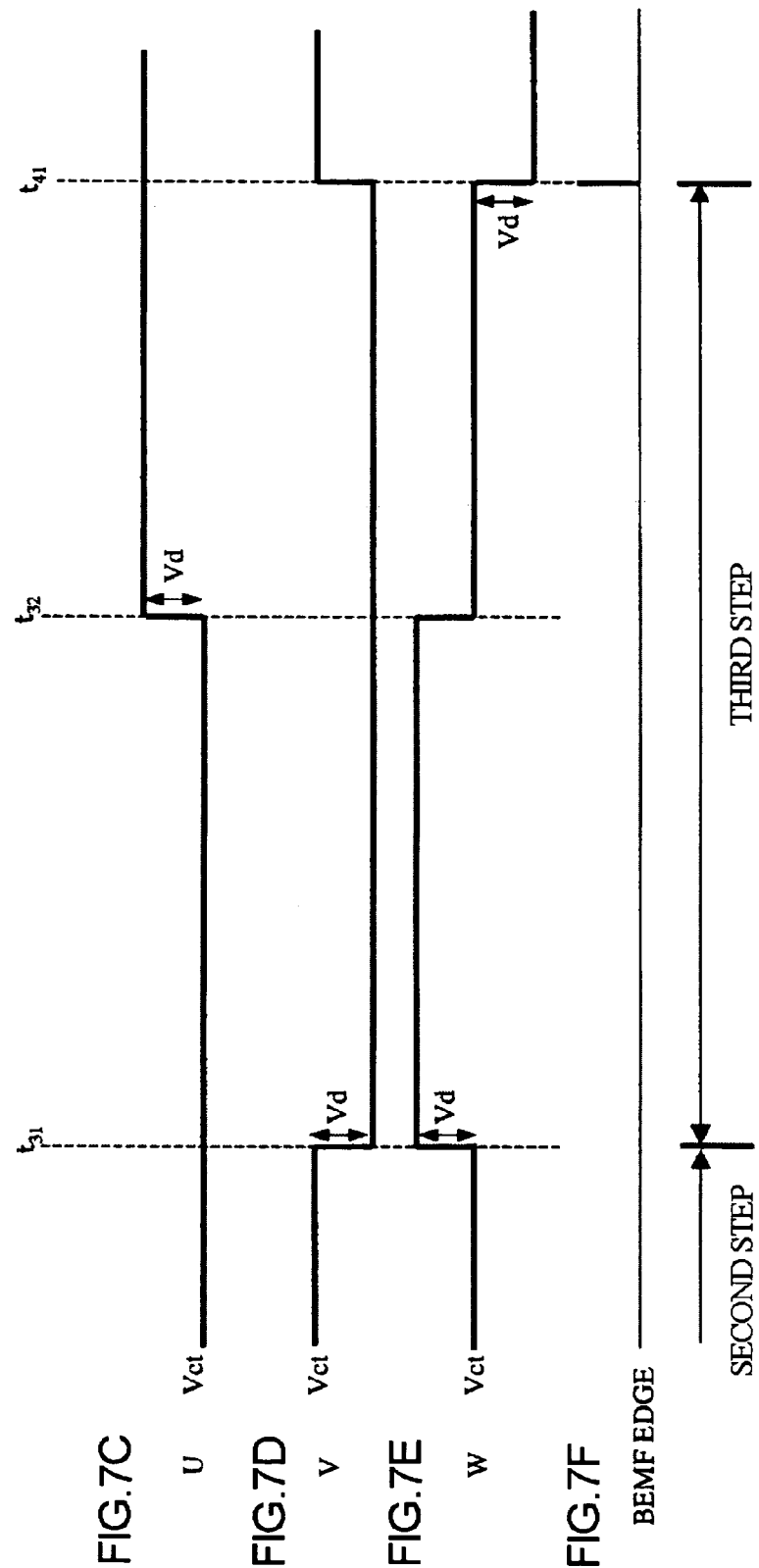

SENSORLESS MOTOR DRIVING APPARATUS AND DRIVING METHOD ADDRESSING PREVENTION OF BACKWARD ROTATION

BACKGROUND ART

1. Field of the Invention

The present invention relates to a sensorless motor driving apparatus which detects a position of rotor without using a Hall sensor and drives a motor so as to rotate in a predetermined direction by controlling the order of energization of phases in accordance with a result of detection.

2. Description of the Related Art

FIG. 8 is a block diagram showing a three-phase sensorless motor driving apparatus commonly used according to the related art. The three-phase sensorless motor driving apparatus shown in FIG. 8 comprises power transistors Tr 801–811, a power supply voltage Vm, a motor 819, comparators 821a–821c, a position detecting circuit 823, and an output transistor control circuit (not shown).

Referring to FIG. 8, U-phase, V-phase and W-phase driving terminals are connected to non-inverting input terminals of the comparators 821a–821c. A center tap of the motor 819 is connected to inverting input terminals of the comparators 821a–821c. Output terminals of the comparators 821a–821c are connected to the position detecting circuit 823. The comparators 821a–821c output binary signals indicating relative magnitudes of a back EMF generated in the U-phase, V-phase and W-phase, and a center tap voltage.

The position detecting circuit 823 determines which of the six transistors Tr 801–811 is to be turned on in accordance with the binary signals output from the comparators 821a–821c, and outputs a logic signal to be supplied to the gate of the transistors Tr 801–811. In accordance with this construction, the binary signals output from the comparators 821a–821c indicate the rotor position. Therefore, the rotor can be smoothly operated by switching between phases for energization in accordance the rotor position.

Accordingly, a commonly used three-phase sensorless motor driving apparatus is constructed such that the rotor position is detected in accordance with the back EMF occurring in phase coils as the rotor rotates, and the motor is driven by switching between phases for energization in accordance with the result of detection.

In this sensorless driving scheme, however, the rotor position cannot be detected and the back EMF does not occur in the phases when the rotor is in a stationary state. In this situation, there is likelihood that the motor may be rotated backward when a driving signal is applied.

A patent document No. 1 discloses an invention related to the present invention. The document discloses that the shaft loss at start-up of a motor is reduced by supplying an excitation current of a frequency higher than the characteristic frequency of the motor to stator coil, prior to the sequential steps of supplying an excitation current at start-up.

[Patent document No. 1]

Japanese Laid-Open Patent Application No. H06-141588

However, it is difficult to prevent backward rotation of a motor even when the invention of the patent document No. 1 is used.

Accordingly, an object of the present invention is to provide a sensorless motor driving apparatus and a driving method in which backward rotation of a motor is prevented.

SUMMARY OF THE INVENTION

The sensorless motor driving apparatus according to the invention comprises: a timing generation circuit generating a timing signal at intervals T; a driving signal generation circuit receiving the timing signal and generating, at the intervals T, pulse signals, the number of which M (=m×L+k) is defined by a sum of a predetermined number k and a product of the number of statuses L of the rotor and an integer (m) equal to or greater than 1; and an amplitude control circuit switching between the commutation patterns of the driving signal in synchronization with the pulse signals, wherein the amplitude control circuit advances the commutation pattern by M phases from a predetermined phase, by switching between the patterns in synchronization with the pulse signals while a torque is generated in the motor, advances the commutation pattern by N phases by switching between the patterns in synchronization with the pulse signals while a torque is not generated in the motor, and switches the commutation pattern in synchronization with pulse signals with pulse intervals of nT while a torque is generated in the motor.

Preferably, the number of statuses L=6, the predetermined number k=2 or 3, N=(an integer equal to or greater than 0)×L+2 or 3, and the pulse interval nT=16 T.

The sensorless motor driving method according to the invention comprises the steps of: placing the motor in a status in which a torque is generated, and generating at intervals T, pulse signals, the number of which M (=m×L+k) is defined by a sum of a predetermined number k and a product of the number of statuses L of the rotor and an integer (m) equal to or greater than 1; advancing the commutation pattern by M phases from a predetermined phase, by switching between the patterns in synchronization with the pulse signals, advancing the commutation pattern by N phases, by switching between the patterns in synchronization with the pulse signals while a torque is not generated in the motor, and switching the commutation pattern in synchronization with pulse signals with pulse intervals of nT while a torque is generated in the motor.

Preferably, the number of statuses L=6, the predetermined number k=2 or 3, N=(an integer equal to or greater than 0)×L+2 or 3, and the pulse interval nT=16 T.

According to the sensorless motor driving apparatus and driving method of the present invention, backward rotation of a motor is prevented.

BRIEF DESCRIPTION OF THE DRAWINGS

FIGS. 2A and 2B are a block diagram showing a motor driving unit according to the embodiment.

FIGS. 3A–3L are time charts of waveforms of signals and voltages according to the embodiment.

FIGS. 4A–4F show relative positions of a rotor and a stator according the embodiment.

FIGS. 5A–5G are time charts showing waveforms of a driving signal, a driving voltage etc. according to the embodiment.

FIGS. 6A–6E are time charts showing waveforms of a driving signal, a driving voltage etc. according to the embodiment.

FIGS. 7A–7F are time charts showing waveforms of a driving signal, a driving voltage etc. according to the embodiment.

DETAILED DESCRIPTION OF THE INVENTION

Figure 1:
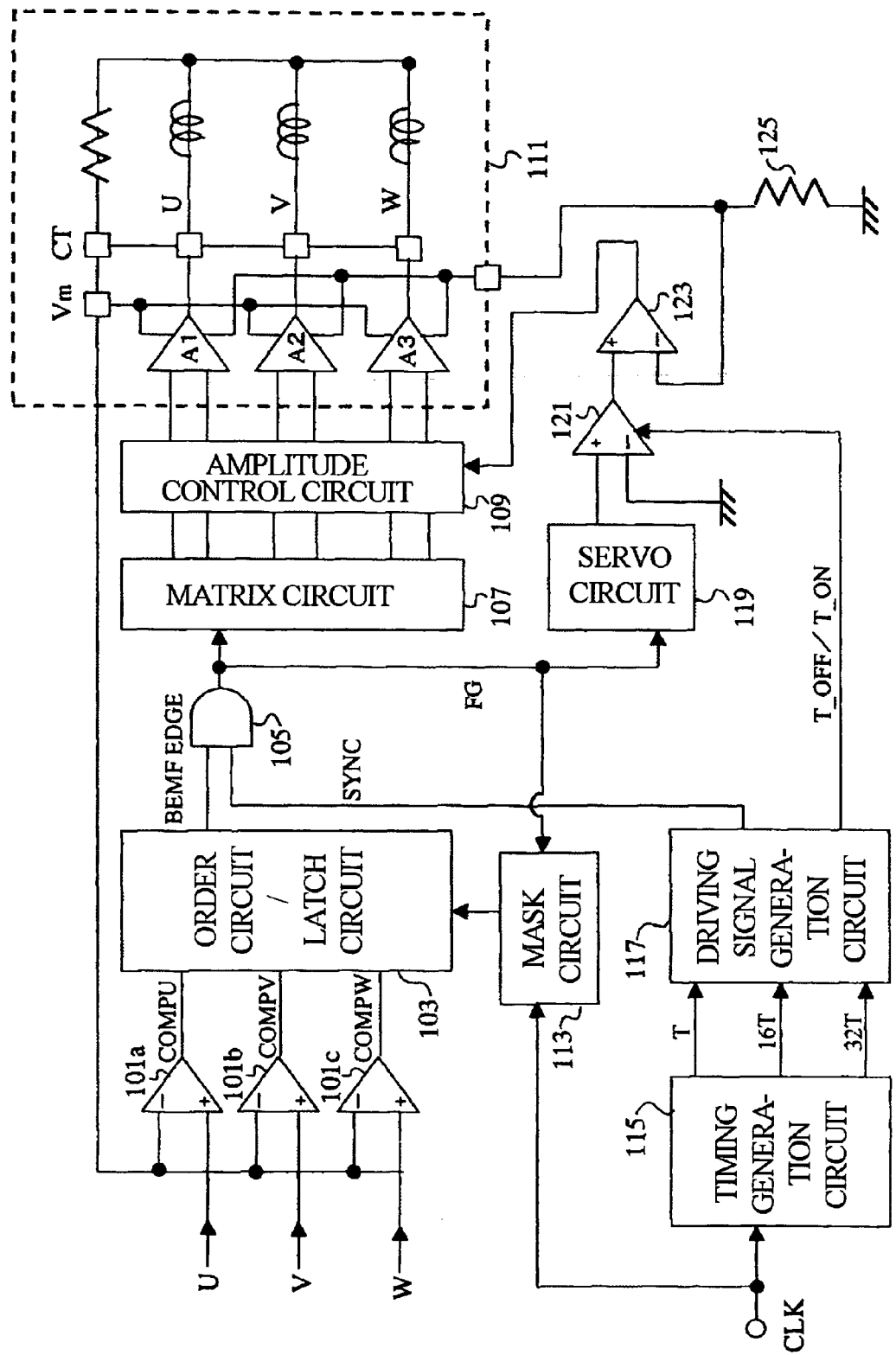
FIG. 1 is a block diagram showing a sensorless motor driving apparatus according to an embodiment of the present invention.

FIG. 1 is a block diagram of a sensorless motor driving apparatus according to an embodiment of the present invention. FIGS. 2A and 2B are block diagrams of a motor driving unit 111 according to the embodiment. FIGS. 3A–3L are time charts showing waveforms of an output signal, a driving voltage etc. according to the embodiment. FIGS. 4A–4F show relative positions of a rotor and a stator according the embodiment. FIGS. 5A–5G, FIGS. 6A–6E and FIGS. 7A–7F are time charts showing waveforms of a driving signal a driving voltage etc. according to the embodiment. A detailed description will now be given of the embodiment of the present invention by referring to these drawings.

(1) Structure of Sensorless Motor Driving Apparatus

The sensorless motor driving apparatus according to the embodiment will be described by referring to FIG. 1 The sensorless motor driving apparatus shown in FIG. 1 comprises comparators 101a–101c, an order circuit/latch circuit 103, an AND circuit 105, a matrix circuit 107, an amplitude control circuit 109, a motor driving unit 111, a mask circuit 113, a timing generation circuit 115, a driving signal generation circuit 117, a servo circuit 119, an error amplifier 121, and a current detection amplifier 123.

Referring to FIG. 1, a center tap CT of the motor driving unit 111 is connected to inverting input terminals of the comparators 101a–101c, and U-phase, V-phase and W-phase driving terminals are connected to non-inverting input terminals of the comparators 101a–101c. Output terminals of the comparators 101a–101c are connected to the order circuit/latch circuit 103. The comparators 101a–101c output binary signals (COMPU, COMPV, COMPW; described in detail later using FIGS. 5A–5G) indicating relative magnitudes of a back EMF generated in the U-phase, V-phase and W-phase, and the center tap voltage.

The order circuit/latch circuit 103 eliminates noise from the output signals (COMPU, COMPV, COMPW) of the comparators 101a–101c and then generates an edge signal (BEMF EDGE; described in detail later using FIGS. 3A–3L, 5A–5G and 7A–7F).

Elimination of noise is performed by a noise mask signal supplied by the mask circuit 113. The noise is generated by the back EMF of the phase coil occurring when the power transistors (Tr 201–211 of FIG. 2A) are switched on or off.

The edge signal (BEMF EDGE) generated by the order circuit/latch circuit 103 is output to the AND circuit 105. The AND circuit 105 produces a "composite edge" (FG; described in detail later using FIGS. 3A–3L) from the edge signal and a driving signal (SYNC; described in detail later using FIGS. 3A–3L, 6A–6E and 7A–7F) and outputs the composite edge to the matrix circuit 107 and the servo circuit 119. An output terminal of the servo circuit 119 is connected to a non-inverting input terminal of the error amplifier 121, and an inverting input terminal of the error amplifier 121 is grounded.

An output terminal of the error amplifier 121 is connected to a non-inverting input terminal of the current detection amplifier 123, and an inverting input terminal of the current detection amplifier 123 is connected to a resistor 125. The other end of the resistor 125 is grounded.

An output terminal of the current detection amplifier 123 is connected to the amplitude control circuit 109. The amplitude control circuit 109 controls a load current by, for example, controlling a gate voltage of the power transistors (Tr 201–211 of FIG. 2A) of the motor driving unit 111, in accordance with an output signal from the current detection amplifier 123.

A reference clock generation circuit (not shown) supplies a reference clock signal (CLK) to the mask circuit 113 and the timing generation circuit 115. The mask circuit 113 supplies the noise mask signal to the order circuit/latch circuit 103 in synchronization with the reference clock signal (CLK). The timing generation circuit 115 evaluates a period T of the reference clock signal (CLK) and outputs predetermined timing signals (intervals T, 16 T and 32 T; described in detail later using FIGS. 3A–3L) to the driving signal generating circuit 117.

The driving signal generation circuit 117 generates the driving signal (SYNC) in synchronization with the timing signals and outputs the driving signal to the AND circuit 105. The driving signal generation circuit 117 supplies a toggle ON/OFF signal (T_ON/T_OFF; described in detail later using FIGS. 3A–3L, 6A–6E and 7A–7F) to the error amplifier 121, the timing of supply being described later.

(2) Structure of Motor Driving Unit 111

FIG. 2A shows the motor driving unit 111 of the sensorless motor driving apparatus (FIG. 1). As illustrated, the motor driving unit 111 is constructed such that a current feeding means constituted by the power transistors Tr 201–211 outputs U-phase, V-phase and W-phase driving currents from phase driving terminals 229u–229w by subjecting Tr 201–211 to on and off control using the driving signal. The motor 219 is driven by feeding the driving current to the respective phases.

FIG. 2B is a general view of the motor 219. The motor 219 is composed of a rotor 221, stators (field cores) 223u–223w, and a phase coil 225. The stators include a U-phase stator 223u, a V-phase stator 223v and a W-phase stator 223w. A center tap 227 of the stators is used to detect the position of the rotor 221 by referring to the back EMF generated in the phase coil.

(3) Signals and voltage waveforms in periods 301–302

FIGS. 3A–3L are time charts showing signals and voltage waveforms occurring in a period 301 in which the motor 219 is in synchronous operation, and in a period 302 in which the motor 219 is operated by the back EMF.

FIG. 3A shows a waveform of a signal to start the rotor 221. A high level of the signal represents a command to stop and a low level represents a command to start.

FIG. 3B shows a waveform of a timing signal output from the timing generation circuits 115 at intervals T, FIG. 3C shows a waveform of a timing signal output from the timing generation circuits 115 at intervals 16 T and FIG. 3D shows a waveform of a timing signal output from the timing generation circuits 115 at intervals 32 T.

FIG. 3E shows a waveform of the driving signal (SYNC) output from the driving signal generation circuit 117.

FIG. 3F shows a waveform of a driving voltage (U) for the U-phase coil, FIG. 3G shows a waveform of a driving voltage (V) for the V-phase coil, and FIG. 3H shows a waveform of a driving voltage (W) for the W-phase coil.

FIG. 3I shows a waveform of a driving current in the U-phase driving terminal, and FIG. 3J shows a waveform of the edge signal (BEMF EDGE).

FIG. 3K shows a waveform of the T_ON/OFF signal output from the driving signal generation circuit 117, and FIG. 3L shows a waveform of the composite edge (FG).

A detailed description of the operation in the periods 301 and 302 will be given by referring to FIGS. 4A–4F, 5A–5G, 6A–6E and 7A–7F.

(4) Description of Operation in Period 302 When the Motor 219 is Driven by the Back EMF FIGS. 4A–4F show relative positions of the stators 223u–223w and the rotor 221 of the motor 219. FIGS. 5A–5G are time charts showing waveforms of the output signals from the comparators, the driving voltages of the phase coils and the edge signal (BEMF EDGE) in a period (the period 302 of FIGS. 3A–3L) in which the motor 219 is driven by the back EMF.

FIG. 5A shows a waveform of the output signal (COMPU) from the comparator 101a, FIG. 5B shows a waveform of the output signal (COMPV) from the comparator 101b and FIG. 5C shows a waveform of the output signal (COMPW) from the comparator 101c.

FIG. 5D shows a waveform of the driving voltage (U) for the U-phase coil, FIG. 5E shows a waveform of the driving voltage (V) for the V-phase coil and FIG. 5F shows a waveform of the driving voltage (W) for the W-phase coil, FIG. 5G shows a waveform of the edge signal (BEMF EDGE). A description will be given of variation of the waveforms and an operation of the motor driving unit 111 by referring to FIGS. 5A–5G.

(4-1) Description of Operation at a Point of Time $t_{o1}$

At a point of time $t_{o1}$ of FIGS. 5A–5G, the transistors Tr 201 and Tr 207 are turned on. The U-phase driving terminal 229u and the power supply Vm are connected, and the V-phase driving terminal 229v is grounded, in synchronization with the edge signal (BEMF EDGE). As a result, the driving current flows from the U-phase driving terminal 229u to the V-phase driving terminal 229v (indicated by an arrow 410b of FIG. 4A).

At this point of time, the W-phase coil is neither connected to the power supply Vm nor grounded and is disconnected from the motor driving unit 111. In this situation, a back EMF is generated in the W-phase coil. The back EMF generated is used in detecting the position of the rotor 221. A description will be given later.

A status 401 of FIG. 4A shows relative positions of the stators 223u–223w and the rotor 221 at the point of time $t_{o1}$. In the status 401, the U-phase stator 223u is an S pole and the V-phase stator 223v is an N pole. In this state, a force is generated by the polarity of the rotor 221 and the stators 223u–223w to bring the rotor and the stators in respective positions where a suction force and a repulsion force are balanced.

As shown in the illustration of the status 401, the W-phase driving terminal 229w, which is in a floating state in terms of electric potential, is located at a midpoint between the S-pole and the N-pole of the rotor 221. If the rotor 221 is displaced by any distance in the counterclockwise direction, the W-phase stator 223w is more strongly influenced by the magnetic flux of the N-pole than by the S-pole of the rotor 221, and turns into an S-pole. Conversely, if the rotor 221 is displaced by any distance in the clockwise direction, the W-phase stator 223w is more strongly influenced by the S-pole than by the N-pole and turns into an N-pole.

Referring to FIG. 4A, an arrow 410a of FIG. 4A indicates a direction of rotation of the rotor 221. Accordingly, it can be seen that the point of time $t_{o1}$ is a moment when the W-phase stator 223w is changed from the S-pole to the N-pole.

Since the status 401 is at a midpoint between a status 406, in which the W-phase driving terminal 229w is connected to the power supply Vm, and a status 402, in which the W-phase driving terminal is grounded, it can be seen that the point of time $t_{o1}$ is a moment when a difference between the center tap voltage and the back EMF of the W-phase is changed from positive to negative. This point of change is generally referred to as a zero crossing point of the difference between the driving terminal voltage and the center tap voltage.

The comparator 101c is used to detect the zero crossing point. More specifically, the center tap voltage and the back EMF of the W-phase coil are input to the input terminals of the comparator 101c. The comparator 101c outputs a binary signal (COMPW) indicating the relative magnitudes of the center tap voltage and the back EMF of the W-phase coil from the output terminal thereof. When detecting the zero crossing point 501 at which COMPW is changed from positive to negative, the order circuit/latch circuit 103 determines that the stators 223u–223w and the rotor 221 are positioned in relation to each other as indicated by the status 401.

(4-2) Description of Operation at a Point of Time $t_{o2}$

Following the detection of the status 401 of the stators 223u–223w and the rotor 221 by referring to the zero crossing point of COMPW, the commutation pattern of driving current is changed at a point of time $t_{o2}$ so that the rotor and the stators are excited in the status 402.

At the point of time $t_{o2}$, the transistors Tr 201 and Tr 207 are turned on. The U-phase driving terminal 229u and the power supply Vm are connected, and the W-phase driving terminal 229w is grounded, in synchronization with the edge signal (BEMF EDGE).

At this point of time, the V-phase coil is neither connected to the power supply Vm nor grounded and is disconnected from the motor driving unit 111. In this situation, a back EMF is generated in the V-phase coil. The back EMF generated is used in detecting the position of the rotor 221. A description will be given later.

The status 402 of FIG. 4B shows relative positions of the stators 223u–223w and the rotor 221 at the point of time $t_{o2}$.

In the status 402, the U-phase stator 223u is an S pole and the W-phase stator 223w is an N pole. It can be seen that the point of time $t_{o2}$ is a moment when the V-phase stator 223v is changed from the N-pole to the S-pole and a moment when a difference between the center tap voltage and the back EMF of the V-phase is changed from negative to positive.

More specifically, the center tap voltage and the back EMF of the V-phase coil are input to the input terminals of the comparator 101b. The comparator 101b outputs a binary signal (COMPV) indicating the relative magnitudes of the center tap voltage and the back EMF of the V-phase coil from the output terminal thereof. When detecting a zero crossing point 502 at which COMPV is changed from negative to positive, the order circuit/latch circuit 103 determines that the stators 223u–223w and the rotor 221 are positioned in relation to each other as indicated by the status 402.

(4-3) Description of Operation at a Point of Time $t_{o3}$

Following the detection of the status 402 of the stators 223u–223w and the rotor 221 by referring to the zero crossing point of COMPV, the commutation pattern of driving current is changed at a point of time $t_{03}$ so that the rotor and the stators are excited in the status 402.

At the point of time $t_{03}$, the transistors Tr 205 and Tr 211 are turned on. The V-phase driving terminal 229v and the power supply Vm are connected, and the W-phase driving terminal 229w is grounded, in synchronization with the edge signal (BEMF EDGE).

At this point of time, the U-phase coil is neither connected to the power supply Vm nor grounded and is disconnected from the motor driving unit 111. In this situation, a back EMF is generated in the U-phase coil. The back EMF generated is used in detecting the position of the rotor 221. A description will be given later.

A status 403 of FIG. 4C shows relative positions of the stators 223u–223w and the rotor 221 at the point of time $t_{03}$.

In the status 403, the W-phase stator 223w is an N pole and the V-phase stator 223v is an S pole. It can be seen that point of time $t_{03}$ is a moment when the U-phase stator 223u is changed from the S-pole to the N-pole and a moment when a difference between the center tap voltage and the back EMF of the U-phase is changed from positive to negative.

More specifically, the center tap voltage and the back EMF of the U-phase coil are input to the input terminals of the comparator 101a. The comparator 101a outputs a binary signal (COMPU) indicating the relative magnitudes of the center tap voltage and the back EMF of the U-phase coil from the output terminal thereof. When detecting the zero crossing point 503 at which COMPU is changed from positive to negative, the order circuit/latch circuit 103 determines that the stators 223u–223w and the rotor 221 are positioned in relation to each other as indicated by the status 403.

(4-4) Description of Operation at a Point of Time $t_{04}$

Following the detection of the status 403 of the stators 223u–223w and the rotor 221 by referring to the zero crossing point of COMPU, the commutation pattern of driving current is changed at a point of time $t_{04}$ so that the rotor and the stators are excited in a status 404.

At the point of time $t_{04}$, the transistors Tr 205 and Tr 203 are turned on. The V-phase driving terminal 229v and the power supply Vm are connected, and the U-phase driving terminal 229u is grounded, in synchronization with the edge signal (BEMF EDGE).

At this point of time, the W-phase coil is neither connected to the power supply Vm nor grounded and is disconnected from the motor driving unit 111. In this situation, a back EMF is generated in the W-phase coil. The back EMF generated is used in detecting the position of the rotor 221. A description will be given later.

The status 404 of FIG. 4D shows relative positions of the stators 223u–223w and the rotor 221 at the point of time $t_{04}$.

In the status 404, the V-phase stator 223v is an S pole and the U-phase stator 223u is an N pole. It can be seen that the point of time $t_{04}$ is a moment when the W-phase stator 223w is changed from the N-pole to the S-pole and a moment when a difference between the center tap voltage and the back EMF of the W-phase changes from negative to positive.

More specifically, the center tap voltage and the back EMF of the W-phase coil are input to the input terminals of the comparator 101c. The comparator 101c outputs a binary signal (COMPW) indicating the relative magnitudes of the center tap voltage and the back EMM of the V-phase coil from the output terminal thereof. When detecting the zero crossing point 504 at which COMPW changes from negative to positive, the order circuit/latch circuit 103 determines that the stators 223u–223w and the rotor 221 are positioned in relation to each other as indicated by the status 404.

(4-5) Description of Operation at a Point of Time $t_{05}$

Following the detection of the status 404 of the stators 223u–223w and the rotor 221 by referring to the zero crossing point of COMPW, the commutation pattern of the driving current is changed at a point of time $t_{05}$ so that the rotor and the stators are excited in the status 405.

At the point of time $t_{05}$, the transistors Tr 209 and Tr 203 are turned on. The W-phase driving terminal 229w and the power supply Vm are connected, and the U-phase driving terminal 229u is grounded, in synchronization with the edge signal (BEMF EDGE).

At this point of time, the V-phase coil is neither connected to the power supply Vm nor grounded and is disconnected from the motor driving unit 111. In this situation, a back EMF is generated in the V-phase coil. The back EMF generated is used in detecting the position of the rotor 221. A description will be given later.

A status 405 of FIG. 4E shows relative positions of the stators 223u–223w and the rotor 221 at point of time $t_{05}$.

In the status 405, the W-phase stator 223w is an S pole and the U-phase stator 223u is an N pole. It can be seen that point of time $t_{05}$ is a moment when the V-phase stator 223v is changed from the S-pole to the N-pole and a moment when a difference between the center tap voltage and the back EMF of the V-phase is changed from positive to negative.

More specifically, the center tap voltage and the back EMF of the V-phase coil are input to the input terminals of the comparator 101b. The comparator 101b outputs a binary signal (COMPV) indicating the relative magnitudes of the center tap voltage and the back EMF of the V-phase coil from the output terminal thereof. When detecting the zero crossing point 505 at which COMPV is changed from positive to negative, the order circuit/latch circuit 103 determines that the stators 223u–223w and the rotor 221 are in the status 405.

(4-6) Description of Operation at Point of Time $t_{06}$

Following the detection of the status 405 of the stators 223u–223w and the rotor 221 by referring to the zero crossing point of COMPV, the commutation pattern of the driving current is changed at point of time $t_{06}$ so that the rotor and the stators are excited in the status 406.

At the point of time $t_{06}$, the transistors Tr 209 and Tr 207 are turned on. The W-phase driving terminal 229w and the power supply Vm are connected, and the V-phase driving terminal 229v is grounded.

At this point of time, the U-phase coil is neither connected to the power supply Vm nor grounded and is disconnected from the motor driving unit 111. In this situation, a back EMF is generated in the U-phase coil. The back EMF generated is used in detecting the position of the rotor 221. A description will be given later.

A status 406 of FIG. 4F shows relative positions of the stators 223u–223w and the rotor 221 at a point of time $t_{06}$.

In the status 406, the W-phase stator 223w is an S pole and the V-phase stator 223v is an N pole. It can be seen that the point of time $t_{06}$ is a moment when the U-phase stator 223u is changed from the N-pole to the S-pole and a moment when a difference between the center tap voltage and the back EMF of the U-phase changes from negative to positive.

More specifically, the center tap voltage and the back EMF of the U-phase coil are input to the input terminals of the comparator 101a. The comparator 101a outputs a binary signal (COMPU) indicating the relative magnitudes of the center tap voltage and the back EMF of the U-phase coil from the output terminal thereof. When detecting the zero crossing point 506 at which COMPU is changed from negative to positive, the order circuit/latch circuit 103 determines that the stators 223$u$–223$w$ and the rotor 221 are positioned in relation to each other as indicated by the status 406.

While the motor 219 is driven by the back EMF, the operation of the points of time $t_{01}$–$t_{06}$ is repeated.

(6) Description of Operation in the Period 301 in Which the Motor 219 is in Synchronous Operation A description will now be given of the operation in the period 301 in which the motor 219 driven by the sensorless motor driving apparatus according to the embodiment is in synchronous operation.

The period 301 comprises first through third steps. An operating procedure in the first and second steps will be described by referring to FIGS. 6A–6E, and an operating procedure in the third step will be described by referring to FIGS. 7A–7F.

As described above, in the period 302 when the motor 219 is driven by the back EMF, the position of the rotor 221 is detected by referring to the back EMF occurring in the phase coils and the motor is driven by switching between commutation patterns of a driving current in accordance with a result of detection.

In a state in which the rotor 221 is stationary, a back EMF does not occur in the phase coils so that it is impossible to detect the position of the rotor 221. Accordingly, in the related-art sensorless motor driving apparatus, a driving signal for exciting the phase coils in a predetermined sequence is supplied to the motor driving unit 111 regardless of the position of the rotor 221.

There was a problem, however, in that a backward torque may be produced when, for example, a driving signal for producing an excitation state of the status 401 is supplied in the status 402 of FIG. 4B of the motor 219. Moreover, due to a low frequency of the driving signal, it takes time to generate a driving signal for subsequent normal rotation. This may cause the motor 219 to be rotated backward.

In the sensorless motor driving apparatus according to the embodiment, the commutation pattern is switched at a frequency high enough to prevent the rotor 221 from being rotated (first step). Subsequently, only the commutation pattern is switched while the torque signal is turned off (second step). The commutation pattern is then switched to that of a normal rotation while the torque signal is turned on (third step) so as to ensure that the motor 219 is not rotated backward. The steps will now be described in detail.

(5-1) First Step

FIG. 6A shows a waveform of the T_ON/OFF signal output from the driving signal generation circuit 117 to the error amplifier 121. As illustrated, the T_ON signal is supplied so that a torque is generated in the motor 219.

FIG. 6B shows a waveform of the driving signal (SYNC) supplied from the driving signal generation circuit 117. As illustrated, eight driving signals are generated at intervals of T (2–4 milliseconds in this embodiment) in the first step. The pulse interval T is determined in accordance with the timing signal generated by the timing generation circuit 115. The interval T is chosen to ensure that the rotor 221 is not rotated backward even when a torque is generated. Therefore, the interval T is altered in accordance with the weight etc. of the rotor 221.

The number of driving signals M (8 in this embodiment) is obtained by a sum of a) a predetermined number (2 in this embodiment) and b) a product of the number of statuses L of the motor 219 (6 in this embodiment) and an integer m equal to or greater than 1 (1 in this embodiment).

FIG. 6C shows a waveform of the driving voltage (U) of the U-phase coil, FIG. 6D shows a waveform of the driving voltage (V) of the V-phase coil and FIG. 6E shows a waveform of the driving voltage (W) of the W-phase coil.

A description will now be given of the commutation patterns and the driving voltage waveforms of the first step (points of time $t_{11}$–$t_{18}$).

(5-1-1) Description of a Point of Time $t_{11}$

The commutation pattern at a point of time $t_{11}$ places the stators 223$u$–223$w$ and the rotor 221 in a spatial relationship illustrated as the status 401 of FIG. 4A.

The transistors Tr 201 and Tr 207 are turned on. The U-phase driving terminal 229$u$ and the power supply Vm are connected, and the V-phase driving terminal 229$v$ is grounded.

As shown in FIGS. 6C–6E, the driving voltage waveform of the U-phase coil is defined by the center tap voltage Vct+an amplitude Vd, the driving voltage waveform of the V-phase coil is defined by a rise from a level defined by the center tap voltage Vct–the amplitude Vd to the center tap voltage Vct, and the driving voltage of the W-phase coil is defined by a fall from the center tap voltage Vct to a level defined by the center tap voltage Vct–the amplitude Vd.

(5-1-2) Description of Operation at a Point of Time $t_{12}$

The commutation pattern at a point of time $t_{12}$ places the stators 223$u$–223$w$ and the rotor 221 in a spatial relationship illustrated as the status 402 of FIG. 4B.

The transistors Tr 201 and Tr 211 are turned on. The U-phase driving terminal 229$u$ and the power supply Vm are connected, and the W-phase driving terminal 229$w$ is grounded, in synchronization with the driving signal (SYNC).

As shown in FIGS. 6C–6E, the driving voltage waveform of the U-phase coil is defined by a rise from a level defined by the center tap voltage Vct+the amplitude Vd to the center tap voltage Vct, the driving voltage waveform of the V-phase coil is defined by a rise from the center tap voltage Vct to a level defined by the center tap voltage Vct+the amplitude Vd, and the driving voltage of the W-phase coil is defined by a fall from the center tap voltage Vct to a level defined by the center tap voltage Vct–the amplitude Vd.

(5-1-3) Description of Operation at a Point of Time $t_{13}$

The commutation pattern at a point of time $t_{13}$ places the stators 223$u$–223$w$ and the rotor 221 in a spatial relationship illustrated as the status 403 of FIG. 4C.

The transistors Tr 205 and Tr 211 are turned on. The V-phase driving terminal 229$v$ and the power supply Vm are connected, and the W-phase driving terminal 229$w$ is grounded, in synchronization with the driving signal (SYNC).

As shown in FIGS. 6C–6E, the driving voltage waveform of the U-phase coil is defined by a fall from the center tap voltage Vct to a level defined by the center tap voltage Vct–the amplitude Vd, the driving voltage waveform of the V-phase coil is defined by the center tap voltage Vct+the amplitude Vd, and the driving voltage of the W-phase coil is defined by a rise from a level defined by the center tap voltage Vct–the amplitude Vd to the center tap voltage Vct.

(5-1-4) Description of Operation at a Point of Time $t_{14}$

The commutation pattern at a point of time $t_{14}$ places the stators 223$u$–223$w$ and the rotor 221 in a spatial relationship illustrated as the status 404 of FIG. 4D.

The transistors Tr 205 and Tr 203 are turned on. The V-phase driving terminal 229v and the power supply Vm are connected, and the U-phase driving terminal 229u is grounded.

As shown in FIGS. 6C–6E, the driving voltage waveform of the U-phase coil is defined by the center tap voltage Vct−the amplitude Vd, the driving voltage waveform of the V-phase coil is defined by a fall from a level defined by the center tap voltage Vct+the amplitude Vd to the center tap voltage Vct, and the driving voltage of the W-phase coil is defined by a rise from the center tap voltage Vct to a level defined by the center tap voltage Vct+the amplitude Vd.

(5-1-5) Description of Operation at a Point of Time $t_{15}$

The commutation pattern at a point of time $t_{15}$ places the stators 223u–223w and the rotor 221 in a spatial relationship illustrated as the status 405 of FIG. 4E.

The transistors Tr 209 and Tr 203 are turned on. The W-phase driving terminal 229w and the power supply Vm are connected, and the U-phase driving terminal 229u is grounded.

As shown in FIGS. 6C–6E, the driving voltage waveform of the U-phase coil is defined by a rise from a level defined by the center tap voltage Vct−the amplitude Vd to the center tap voltage Vct, the driving voltage waveform of the V-phase coil is defined by a fall from the center tap voltage Vct to a level defined by the center tap voltage Vct−the amplitude Vd, and the driving voltage of the W-phase coil is defined by the center tap voltage Vct+the amplitude Vd.

(5-1-6) Description of Operation at Point of Time $t_{16}$

The commutation pattern at a point of time $t_{16}$ places the stators 223u–223w and the rotor 221 in a spatial relationship illustrated as the status 406 of FIG. 4F.

The transistors Tr 209 and Tr 207 are turned on. The W-phase driving terminal 229w and the power supply Vm are connected, and the V-phase driving terminal 229v is grounded.

As shown in FIGS. 6C–6E, the driving voltage waveform of the U-phase coil is defined by a rise from the center tap voltage Vct to a level defined by the center tap voltage Vct+the amplitude Vd, the driving voltage waveform of the V-phase coil is defined by the center tap voltage Vct−the amplitude Vd, and the driving voltage of the W-phase coil is defined by a fall from a level defined by the center tap voltage Vct+the amplitude Vd to the center tap voltage Vct.

(5-1-7) Description of a Point of Time $t_{17}$

As in the case of the point of time $t_{11}$, the commutation pattern is switched to the pattern that places the rotor and the stators in the excitation status 401 of FIG. 4A, so that the description thereof is omitted.

(5-1-8) Description of a Point of Time $t_{18}$

As in the case of the point of time $t_{12}$, the commutation pattern is switched to the pattern that places the rotor and the stators in the excitation status 402 of FIG. 4B, so that the description thereof is omitted.

<Operation of the Rotor 221 in the First Step>

(5-1-9) In Case the Motor 219 is Halted in the Status 401 at the Point of Time $t_{11}$ The rotor 221 is rotated in accordance with the switching of commutation pattern at points of time $t_{11}$–$t_{18}$ and comes to a halt in the status 402 of FIG. 4B in which the rotor 221 is excited by the commutation pattern occurring at the end of the first step.

(5-1-10) In Case the Motor 219 is Halted in the Status 402 at the Point of Time $t_{11}$ According to the related art, there is likelihood that the motor 219 halted in the status 402 is rotated backward when the above-described commutation pattern at the point of time $t_{11}$ occurs. According to the present invention, however, the pulse interval T of SYNC is sufficiently small so that the rotor 221 remains halted as the commutation pattern advances by one phase (from the point of time $t_{11}$ to the point of time $t_{12}$). At the point of time $t_{12}$, the halting position (the status 402) of the motor 219 matches the position designated by the commutation pattern. Thereafter, the motor 219 continues to be rotated in accordance with the commutation pattern switching at the points of time $t_{13}$–$t_{18}$ and is placed in the status 402 in which the motor 219 is excited by the commutation pattern occurring at the end of the first step.

(5-1-11) In Case the Motor 219 is Halted in the Status 403 at the Point of Time $t_{11}$ According to the related art, there is likelihood that the motor 219 halted in the status 403 is rotated backward when the above-described commutation pattern at the point of time $t_{11}$ occurs. According to the present invention, however, the pulse interval T of SYNC is sufficiently small so that the rotor 221 remains halted as the commutation pattern advances by two phases (from the point of time $t_{11}$ to the point of time $t_{13}$). At the point of time $t_{13}$, the halting position (the status 403) of the motor 219 matches the position designated by the commutation pattern. Thereafter, the motor 219 continues to be rotated in accordance with the commutation pattern switching at the points of time $t_{14}$–$t_{18}$ and is placed in the status 402 in which the motor 219 is excited by the commutation pattern occurring at the end of the first step.

(5-1-12) In case the motor 219 is halted in the status 404 at the point of time $t_{11}$ According to the related art, there is likelihood that the motor 219 halted in the status 404 is rotated backward when the above-described commutation pattern at the point of time $t_{11}$ occurs. According to the present invention, however, the pulse interval T of SYNC is sufficiently small so that the rotor 221 remains halted as the commutation pattern advances by three phases (from the point of time $t_{11}$ to the point of time $t_{14}$). At the point of time $t_{14}$, the halting position (the status 404) of the motor 219 matches the position designated by the commutation pattern. Thereafter, the motor 219 continues to be rotated in accordance with the commutation pattern switching at the points of time $t_{15}$–$t_{18}$ and is placed in the status 402 in which the motor 219 is excited by the commutation pattern occurring at the end of the first step.

(5-1-13) In Case the Motor 219 is Halted in the Status 405 at the Point of Time $t_{11}$ The rotor 221 is rotated in accordance with the commutation pattern switching at the points of time $t_{11}$–$t_{18}$ and is placed in the status 402 in which the motor 219 is excited by the commutation pattern occurring at the end of the first step.

(5-1-14) In Case the Motor 219 is Halted in the Status 406 at the Point of Time $t_{11}$ The rotor 221 is rotated in accordance with the commutation pattern switching at the points of time $t_{11}$–$t_{18}$ and is placed in the status 402 in which the motor 219 is excited by the commutation pattern occurring at the end of the first step.

As described above, regardless of the status 401–406 in which the motor 219 is halted at the point of time $t_{11}$, the motor 219 is prevented from being rotated backward in the first step.

(5-2) Second Step

Figure 8:
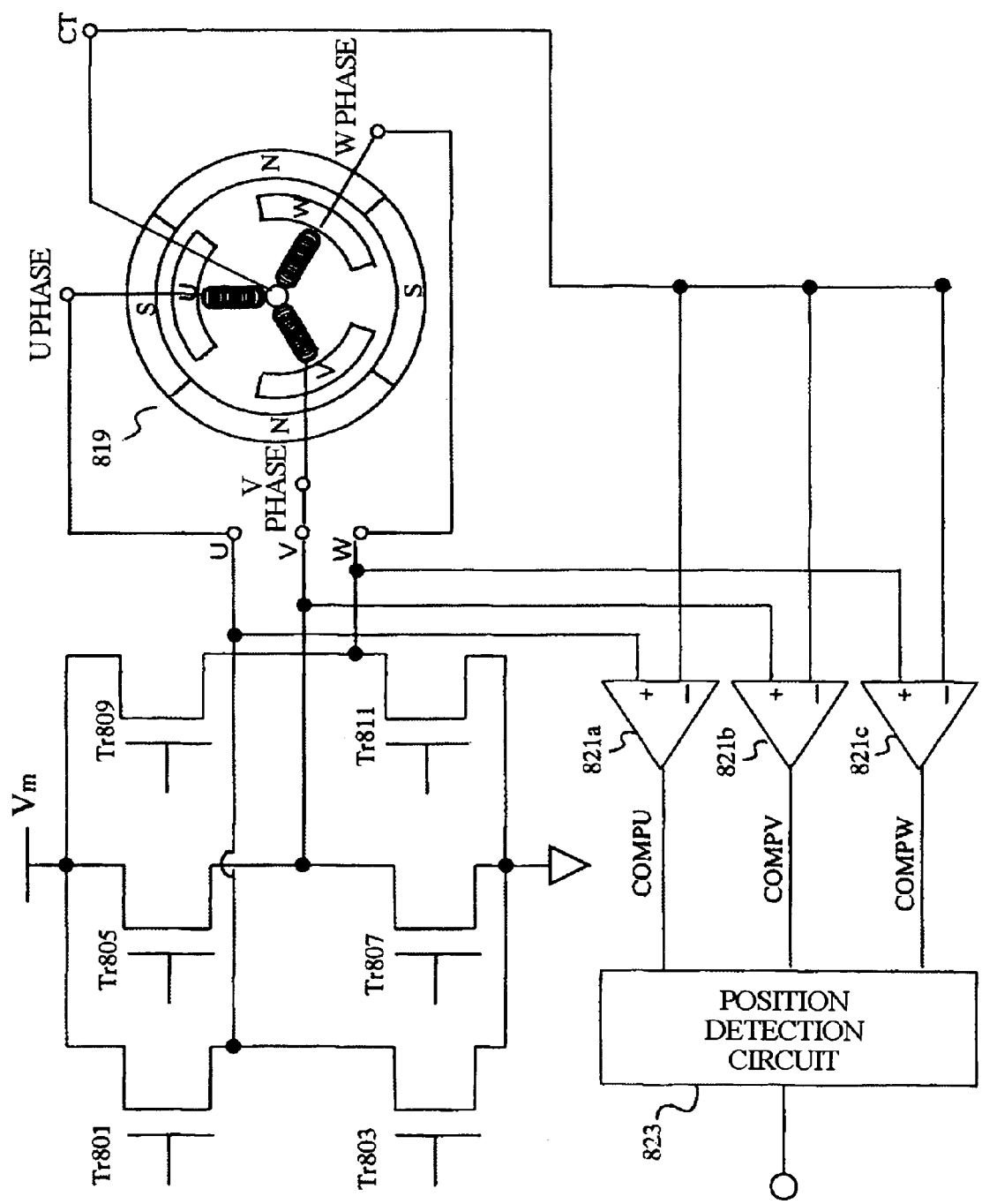
FIG. 8 is a block diagram of a commonly used sensorless motor driving apparatus according to the related art.

As shown in FIG. 6A, the T_OFF signal is supplied in the second step so that a torque is not generated in the motor 219. As shown in FIG. 6B, 8 driving signals (SYNC) are generated at the pulse intervals T in the second step.

In this step, the amplitude control circuit 109 subjects the transistors Tr 201–211 to on and off control in synchronization with SYNC and continues to advance the commutation pattern by N phases (8 phases in this embodiment). More specifically, the power transistors (Tr 201–211 of FIG. 2A) are subject to on and off switching such that the resultant commutation patterns successively place the stators 223u–223w and the rotor 221 in the status 403 (+1 phase), the status 404 (+2 phases), the status 405 (+3 phases), the status 406 (+4 phases), the status 401 (+5 phases), the status 402 (+6 phases), the status 403 (+7 phases), and the status 404 (+8 phases).

Since a torque is not generated in the motor 219, the stators 223u–223w and the rotor 221 remain in the status 402 of FIG. 4B, the same status that occurs at the end of the first step (the point of time $t_{18}$).

As shown in FIGS. 6C–6E, the driving voltage is not generated in the phase coils and is converged to the center tap voltage Vct as the time elapses (see the point of time $t_{23}$).

(5-3) Third Step

A description will now be given of an operating procedure in the third step by referring to FIGS. 7A–7F. FIG. 7A shows a waveform of the T_ON/OFF signal output from the driving signal generation circuit 117 to the error amplifier 121. As shown in FIG. 7A, the T_OFF signal is supplied in the third step so that a torque is generated in the motor 219.

FIG. 7B shows a waveform of the driving signal (SYNC) supplied by the driving signal generation circuit 117. As shown in FIGS. 7A–7F and 3A–3L, the driving signal is generated at the pulse intervals of 16 T.

FIG. 7C shows a waveform of the driving voltage (U) of the U-phase coil, FIG. 7D shows a waveform of the driving voltage (V) of the V-phase coil and FIG. 7E shows a waveform of the driving voltage (W) of the W-phase coil.

FIG. 7F shows a waveform of the edge signal (BEMF EDGE). A description will now be given of the commutation patterns and the driving voltage waveforms of the third step (points of time $t_{31}$–$t_{41}$).

(5-3-1) Description of a Point of Time $t_{31}$

As shown in FIG. 7A, the driving signal generation circuit 117 supplies the T_ON signal to the error amplifier 121 so that a torque is not generated in the motor 219.

As described before, the commutation pattern is advanced by 8 phases in the second step so that, at the end of the second step (the point of time $t_{28}$ of FIGS. 6A–6E), the stators 223u–223w and the rotor 221 are in a spatial relationship illustrated as the status 404 of FIG. 4D.

The commutation pattern at the beginning of the third step (a point of time $t_{31}$) places the stators 223u–223w and the rotor 221 in a spatial relationship illustrated as the status 405 of FIG. 4E. The transistors Tr 201 and 203 are turned on. The W-phase driving terminal 229w and the power supply Vm are connected, and the U-phase driving terminal 229u is grounded, in synchronization with the driving signal (SYNC).

As described above, regardless of the halting position (one of the statuses 401–406) of the motor 219, the motor 219 remains stationary in the status 402 of FIG. 4B, in which the motor 219 is excited by the commutation pattern occurring at the end of the first step, in a period of time between the end of the first step (the point of time $t_{18}$) and the end of the second step (the point of time $t_{28}$).

Accordingly, the rotor 221 is rotated in a normal direction (the direction indicated by the arrow 410a of FIG. 4A) in accordance with the commutation pattern switching as described above, resulting in the stators 223u–223w and the rotor 221 being in a spatial relationship illustrated as the status 405 of FIG. 4E.

As shown in FIGS. 7C–E, the driving voltage waveform of the U-phase coil is defined by the center tap voltage Vct, the driving voltage waveform of the V-phase coil is defined by a fall from the center tap voltage Vct to a level defined by the center tap voltage Vct–the amplitude Vd, and the driving voltage of the W-phase coil is defined by a rise from the center tap voltage Vct to a level defined by the center tap voltage Vct+the amplitude Vd.

(5-3-2) Description of a Point of Time $t_{32}$

As shown in FIG. 7B, supply of the driving signals (SYNC) at the pulse intervals of 16 T is started at a point of time $t_{31}$. As mentioned before, the commutation pattern at the point of time $t_{31}$ places the stators 223u–223w and the rotor 221 in a spatial relationship illustrated as the status 405 of FIG. 4E. Therefore, the commutation pattern at the point of time $t_{32}$ places the stators 223u–223w and the rotor 221 in a spatial relationship illustrated as the status 406 of FIG. 4F.

The transistors Tr 209 and 207 are turned on. The W-phase driving terminal 229w and the power supply Vm are connected, and the V-phase driving terminal 229v is grounded. The rotor 221 is rotated in a normal direction (the direction indicated by the arrow 410a of FIG. 4A) in accordance with the commutation pattern switching as described above, resulting in the stators 223u–223w and the rotor 221 being placed in the status 406 of FIG. 4F.

As shown in FIGS. 7C–7E, the driving voltage waveform of the U-phase coil is defined by a rise from the center tap voltage Vct to a level defined by the center tap voltage Vct+the amplitude Vd, the driving voltage waveform of the V-phase coil is defined by the center tap voltage Vct, and the driving voltage of the W-phase coil is defined by a fall from a level defined by the center tap voltage Vct+the amplitude Vd to the center tap voltage Vct.

At this point of time, the U-phase coil is neither connected to the power supply Vm nor grounded and is disconnected from the motor driving unit 111. In this situation, a back EMF is generated in the U-phase coil.

The center tap voltage and the back EMF generated are input to the input terminals of the comparator 101a. The comparator 101b outputs a binary signal (COMPU) indicating the relative magnitudes of the center tap voltage and the back EMF of the U-phase coil from the output terminal thereof. After eliminating noise from the output signal (COMPU) of the comparator 101a, the order circuit/latch circuit 103 generates the edge signal (BEMF_EDGE) (the point of time $t_{41}$).

(5-3-3) Description of the Point of Time $t_{41}$

At the point of time $t_{41}$, the transistors Tr 201 and Tr 207 are turned on. The U-phase driving terminal 229u and the power supply Vm are connected, and the V-phase driving terminal 229v is grounded.

As shown in FIGS. 7C–7E, the driving voltage waveform of the U-phase coil is defined by the center tap voltage Vct+the amplitude Vd, the driving voltage waveform of the V-phase coil is defined by a rise from the center tap voltage Vct to a level defined by the center tap voltage Vct+the amplitude Vd, and the driving voltage of the W-phase coil is defined by a fall from the center tap voltage Vct to a level defined by the center tap voltage Vct−the amplitude Vd. Subsequently, the motor is driven by the back EMF as described with reference to FIGS. 3A–3L.

Given above is a detailed description of the embodiment of the present invention. It will be obvious that the invention can be practiced in alternative ways.

For example, the first step in the period 301 according to the embodiment is started with the commutation pattern that excites the motor in the status 401 of FIG. 4A. It will be obvious that the first step can be started with any commutation pattern. The number of statuses L is 6 according to the embodiment. Alternatively, L may be any integer equal to or greater than 2.

In the embodiment, the predetermined number k is 2. Alternatively, k=3 may be employed. In the embodiment, the pulse interval T of the drive signal (SYNC) is 2–4 milliseconds. Alternatively, any appropriate interval may be used. In the embodiment, the number of phases N=8. Alternatively, N may be any number as long as N=(an integer equal to or greater than 0)×L+2 or 3.

In the embodiment, the pulse interval nT of SYNC in the third step is 16 T. Alternatively, any appropriate interval may be used.

The sensorless motor driving apparatus and driving method according to the present invention is applicable to electronic appliances and various other apparatuses.

What is claimed is:

1. A sensorless motor driving apparatus which drives a motor by detecting a position of a rotor by referring to a back electromotive force produced in phase coils and switching between commutation patterns of a driving current in accordance with a result of detection, comprising:
a timing generation circuit generating a timing signal at intervals T;
a driving signal generation circuit receiving the timing signal and generating, at the intervals T, pulse signals, the number of which M (=m×L+k) is defined by a sum of a predetermined number k, where k is an integer equal to or greater than 1, and a product of a number of statuses L, indicating the number of relative positions of the rotor and the stator, and an integer (m) equal to or greater than 1; and
an amplitude control circuit switching between the commutation patterns of the driving signal in synchronization with the pulse signals, wherein
said amplitude control circuit advances the commutation pattern by M phases from a predetermined phase, by switching between the patterns in synchronization with the pulse signals while a torque is generated in the motor, advances the commutation pattern by N phases, where N is an integer equal to or greater than 1, by switching between the patterns in synchronization with the pulse signals while a torque is not generated in the motor, and switches the commutation pattern in synchronization with pulse signals with pulse intervals of nT, where n is an integer equal to or greater than 1, while a torque is generated in the motor.

2. The sensorless motor driving apparatus according to claim 1, wherein the number of statuses L=6, and the predetermined number k=2 or 3.

3. The sensorless motor driving apparatus according to claim 1, wherein N=(an integer equal to or greater than 0)×L+(2 or 3).

4. The sensorless motor driving apparatus according to claim 2, wherein N=(an integer equal to or greater than 0)×L+(2 or 3).

5. The sensorless motor driving apparatus according to claim 1, wherein the pulse interval nT=16T.

6. The sensorless motor driving apparatus according to claim 2, wherein the pulse interval nT=16T.

7. A sensorless motor driving method which drives a motor by detecting a position of a rotor by referring to a back electromotive force produced in phase coils and switching between commutation patterns of a driving current in accordance with a result of detection, comprising:
placing the motor in a status in which a torque is generated, and generating at intervals T, pulse signals, the number of which M (=m ×L+k) is defined by a sum of a predetermined number k, where k is an integer equal to or greater than 1, and a product of a number of statuses L, indicating the number of relative positions of the rotor and the stator, and an integer (m) equal to or greater than 1;
advancing the commutation pattern by M phases from a predetermined phase, by switching between the patterns in synchronization with the pulse signals,
advancing the commutation pattern by N phases, where N is an integer equal to or greater than 1, by switching between the patterns in synchronization with the pulse signals while a torque is not generated in the motor, and switching the commutation pattern in synchronization with pulse signals with pulse intervals of nT, where n is an integer equal to or greater than 1, while a torque is generated in the motor.

8. The sensorless motor driving method according to claim 7, wherein the number of statuses L=6, and the predetermined number k=2 or 3.

9. The sensorless motor driving method according to claim 7, wherein N=(an integer equal to or greater than 0)×L+(2 or 3).

10. The sensorless motor driving method according to claim 8, wherein N=(an integer equal to or greater than 0)×L+(2 or 3).

11. The sensorless motor driving apparatus according to claim 7, wherein the pulse interval nT=16T.

12. The sensorless motor driving apparatus according to claim 8, wherein the pulse interval nT=16T.

* * * * *